Figure 1:
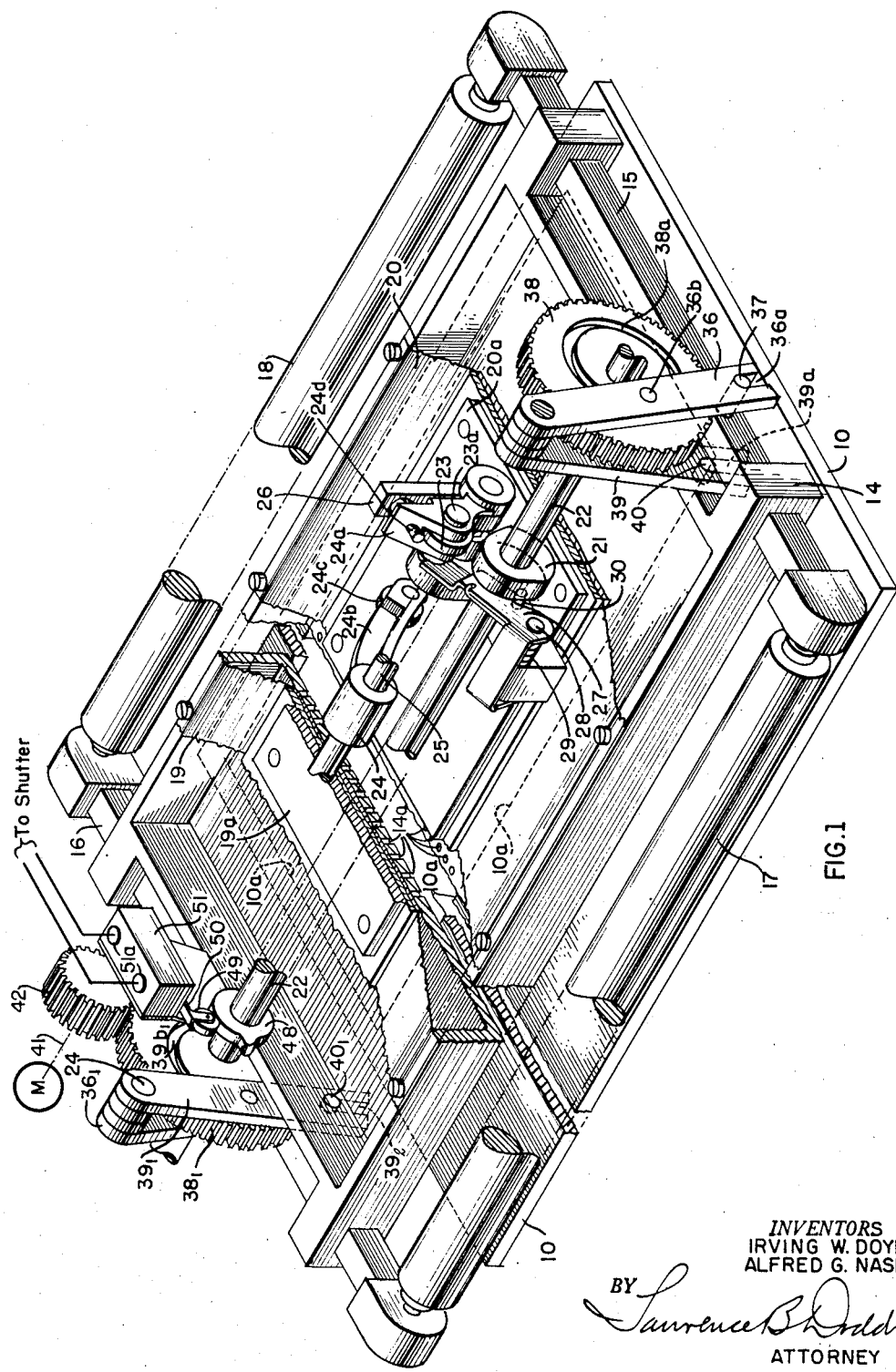

June 18, 1957     I. W. DOYLE ET AL     2,796,009
FILM TRANSPORT MECHANISM FOR CAMERAS
Filed July 16, 1952     4 Sheets-Sheet 1

INVENTORS
IRVING W. DOYLE
ALFRED G. NASH
BY
ATTORNEY

June 18, 1957     I. W. DOYLE ET AL     2,796,009
FILM TRANSPORT MECHANISM FOR CAMERAS
Filed July 16, 1952     4 Sheets-Sheet 2

INVENTORS
IRVING W. DOYLE
ALFRED G. NASH
BY
ATTORNEY

June 18, 1957     I. W. DOYLE ET AL     2,796,009
FILM TRANSPORT MECHANISM FOR CAMERAS
Filed July 16, 1952     4 Sheets-Sheet 3

*INVENTORS*
*IRVING W. DOYLE*
*ALFRED G. NASH*
BY Laurence B. Dodds
ATTORNEY

June 18, 1957  I. W. DOYLE ET AL  2,796,009
FILM TRANSPORT MECHANISM FOR CAMERAS
Filed July 16, 1952  4 Sheets-Sheet 4

INVENTORS
IRVING W. DOYLE
ALFRED G. NASH
BY
ATTORNEY

United States Patent Office 2,796,009
Patented June 18, 1957

2,796,009

FILM TRANSPORT MECHANISM FOR CAMERAS

Irving W. Doyle, Massapequa, and Alfred G. Nash, Glen Cove, N. Y., assignors to Fairchild Camera and Instrument Corporation, a corporation of Delaware Application July 16, 1952, Serial No. 299,128

3 Claims. (Cl. 95—12.5)

This invention relates to film transport mechanisms for cameras and, while it is of general application, it is particularly useful in focal-plane aerial cameras designed to make a series of exposures in rapid succession and will be described in such an embodiment.

In making a rapid series of exposures with an aerial camera, it is desirable that the film be advanced across the aperture at a high velocity between exposures by a distance equal to one frame and then slowed down during exposure to a relatively low velocity effective to compensate for the relative object velocity. In modern aerial mapping and reconnaissance cameras, the film-feed spool may carry as much as 1000 feet of film up to 18 inches in width weighing 70 pounds or more. The intermittent acceleration and deceleration of such a mass of film and its associated film-advancing mechanism between the high velocity between exposures and the low velocity during exposures would be extremely difficult, involving a driving mechanism of very considerable power and weight which is, of course, undesirable in aerial cameras.

It is an object of the present invention, therefore, to provide a new and improved film transport mechanism for cameras which obviates the above-mentioned disadvantages of prior film transport mechanisms of this type.

It is another object of the invention to provide a new and improved film transport mechanism for cameras in which the film is advanced through the mechanism at a substantially constant velocity, thereby avoiding the necessity of intermittent acceleration and deceleration of the film-feed and take-up mechanisms.

In accordance with the invention, there is provided a film transport mechanism for a camera including an aperture frame comprising a film platen, a carriage reciprocable across the camera aperture including means for supporting a film and translating it past the camera aperture and a substantially constant-speed film-advancing mechanism for translating a film through the carriage independently of the movement thereof. The mechanism also includes a reciprocating mechanism including a drive shaft, a pair of cams coupled thereto, and a first pivoted lever having a follower engaging one of said cams and connected to drive the carriage during the interval between exposures in the same direction as the direction of advance of the film and during exposure in a direction opposite to the direction of advance of the film. One of the cams is proportioned to impart to the film during exposure a relatively low velocity of a value substantially to compensate for image velocity and between exposures a relatively high velocity. The mechanism further comprises means including a second pivoted lever having a follower engaging the other of the cams for reciprocating the platen during exposure at a velocity substantially equal to that of the film and a pair of coupled adjustable mechanisms for individually and simultaneously shifting the pivots of such levers to adjust the velocities of the carriage and the platen in opposite senses to adjust the percentage overlap of successive exposures.

For a better understanding of the present invention, together with other and further objects thereof, reference is had to the following description taken in connection with the accompanying drawings, while its scope will be pointed out in the appended claims.

Figure 2A:
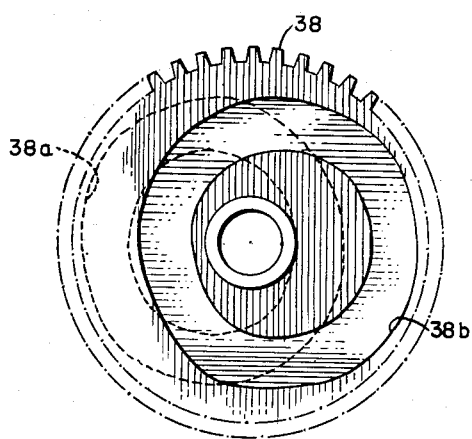
Figure 2B:
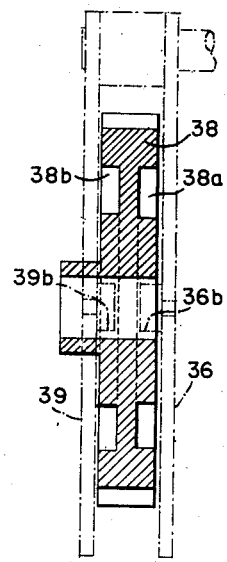
Figure 3:
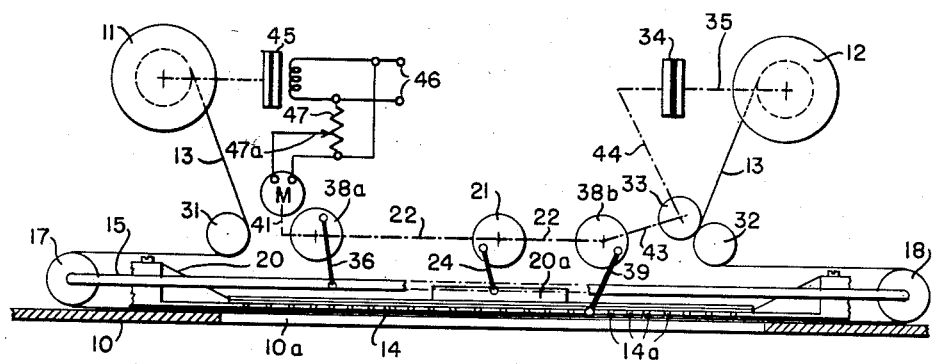
Figure 4:
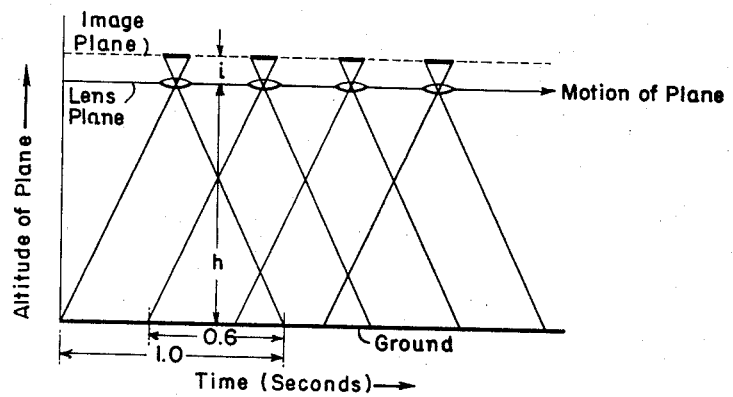
Figure 5:
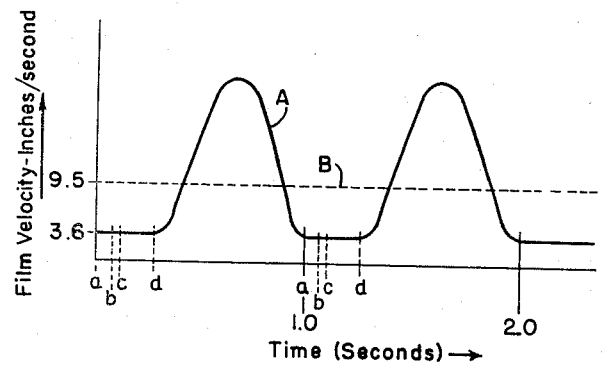
Figure 6:
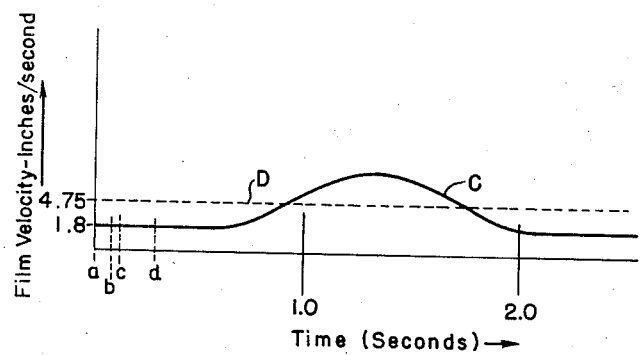
Figure 7:
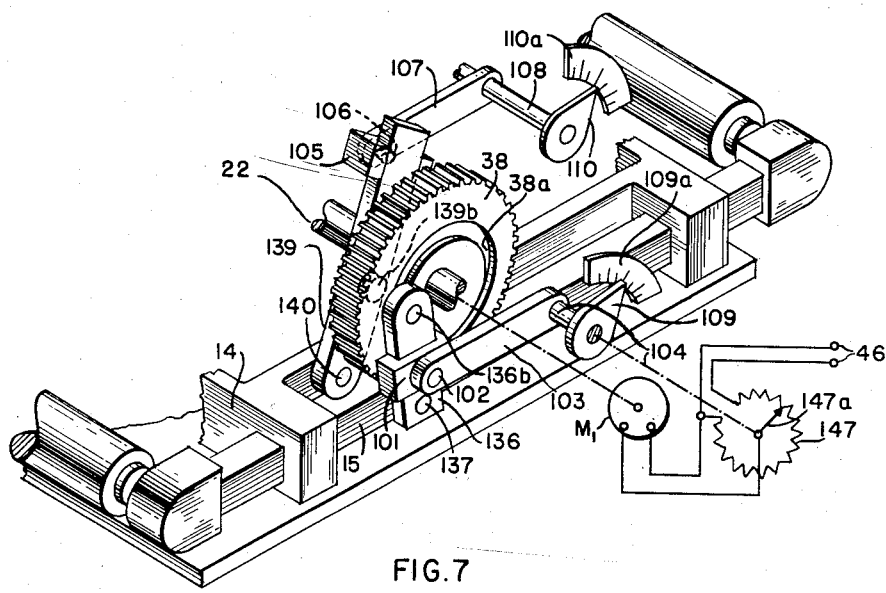
Figure 8:
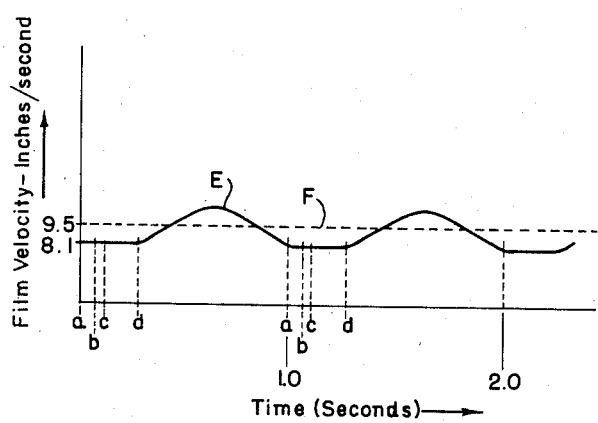

Referring now to the drawings, Fig. 1 is a perspective view of a film transport mechanism to which the invention may be applied; Figs. 2a and 2b comprise a detailed elevation and a cross-sectional view, respectively, of certain of the cam devices of the apparatus of Fig. 1; Fig. 3 is a schematic representation of the apparatus of Fig. 1 and the associated film-feed and film take-up devices to aid in understanding the invention; Figs. 4, 5, and 6 are charts showing certain operating characteristics of the apparatus of Fig. 1 to aid in the explanation of its operation; Fig. 7 is a perspective view of a modified form of reciprocating mechanism for use in the apparatus of Fig. 1; while Fig. 8 is a chart of certain operating characteristics of the film transport mechanism of the invention incorporating the modified reciprocating mechanism of Fig. 7.

Referring now more particularly to Fig. 1 of the drawings, there is illustrated a film transport mechanism for a camera including an aperture frame 10 having an aperture 10a. As represented in Fig. 3, the transport mechanism includes a film-feed spool 11 and a film take-up spool 12 between which a strip of film 13 is exchanged. Superimposed over the aperture 10a is a vacuum-back film platen 14 having a series of apertures 14a. The film transport mechanism also includes a carriage comprising a pair of end bars 15, 16 which is reciprocable across the camera aperture 10a. This carriage includes means, such as a pair of rollers 17, 18 mounted at either end thereof, for supporting the film 13 and translating it past the camera aperture 10a between the platen 14 and the aperture frame 10.

The film transport mechanism further comprises means for maintaining intimate contact between the platen 14 and a translated film 13 during exposure. Specifically, this latter means comprises a diaphragm means, such as a pair of diaphragms 19, 20, having actuating plates 19a, 20a secured thereto for applying a vacuum to the platen 14 during exposure for maintaining the film in intimate contact with the platen. There is also provided a rotatable cam device, such as a cam disc 21, mounted on a drive shaft 22 for actuating the diaphragm plates 19a, 20a. The cam 21 co-operates with a cam follower roller 23 mounted on a pivot shaft 23a in an arm 24a of a crank 24 pivotally mounted on a shaft 25. The crank 24 includes a second arm 24b carrying a roller 24c contacting one of the diaphragm plates, such as the diaphragm plate 20a. It will be understood that the resilience of the diaphragms 19 and 20 normally draws them upward into a horizontal plane and they are driven downwardly periodically by the mechanism just described. The crank arm 24a is provided with an adjustable screw stop 24d adapted to engage a fixed limit stop 26. The diaphragm actuating crank 24 is provided with a latch arm 27 mounted on a fixed pivot 28 and having a spring 29 biasing it clockwise into engagement with the cam 21. As described hereinafter, in the operation of the film transport mechanism, the cam 21 lifts the crank arm 24a and rocks the crank 24 clockwise about its pivot shaft 25, permitting the latch 27 to fall with its notched end in engagement with the pivot shaft 23a to lock it in that position, as illustrated. Extending from the rear face of cam disc 21 is a pin 30 which, at an appropriate point in the cycle of rotation of the shaft 22, engages and lifts the latch arm 27 to release the crank 24 and thereby release the diaphragm 20. It will be understood that the mechanism for actuating the diaphragm 20 is duplicated for the diaphragm 19 but, for the sake of clarity, is omitted from the left-hand fragmentary portion of the film transport mechanism.

The film transport mechanism of the invention also includes a substantially constant-speed film-advancing mechanism for translating the film 13 through the carriage 15, 16. By the term "constant-speed" as applied to the film-advancing mechanism is meant that the speed of operation is substantially constant over a complete exposure cycle, although the speed may be adjustable for different operating conditions of the camera. This film-advancing mechanism is shown in Fig. 3 and includes a pair of fixed film guide rollers 31, 32 co-operating with the film-supporting rollers 17, 18, respectively, to form a film loop at either end of the carriage and a constant-speed metering roller 33 co-operating with the roller 32, acting as a pinch roller, for drawing the film 13 from the feed spool 11, translating it through the carriage, and supplying it to the take-up spool 12. There is provided a substantially constant-torque driving mechanism for the takeup spool 12 having a driving torque of a value insufficient to draw the film through the advancing mechanism described but adequate to keep the film 13 suitably tensioned. This constant-torque driving mechanism may be of any well-known type, such as a hysteresis torque mechanism represented schematically at 34, connected to drive the feed spool 12 through a shaft schematically indicated at 35.

The film transport mechanism of the invention further includes a reciprocating mechanism connected to drive the carriage 15, 16 during the interval between exposures in the same direction as the direction of advance of the film and during exposure in a direction opposite to the direction of advance of the film. This reciprocating mechanism comprises a lever 36 pivoted on the shaft 25 and having a slotted end 36a engaging a pin 37 attached to the bar 15 of the carriage. The lever 36 is actuated by a rotatable cam having a configuration proportioned to impart to the carriage 15, 16 a velocity varying in such a way that there is imparted to the film 13 during exposure a relatively low velocity of a value substantially to compensate for relative object motion and between exposures a relatively high velocity. Specifically, the cam is in the form of a gear 38 having a cam groove 38a engaged by a pin 36b projecting from the lever 36.

The film transport mechanism also includes means for reciprocating the platen 14 during exposure at a velocity substantially equal to the resultant velocity of the film 13. This reciprocating means includes a second cam groove 38b on the opposite face of the cam 38 and engaging a pin 39b projecting from a lever 39 also pivoted on the shaft 25. The end of the lever 39 has a slot 39a engaging a pin 40 extending from the platen 14. A duplicate of the reciprocating mechanism for the carriage 15, 16 and the platen 14 is preferably provided at the opposite end of the film transport mechanism to eliminate possible binding or twisting movement of the carriage 15, 16. The elements of this mechanism are identified by corresponding reference numerals with the subscript "1" added.

The film transport mechanism of the invention further comprises means for driving or rotating all of the cam devices in synchronism, one revolution for each film frame. This mechanism may be in the form of a motor schematically represented at M connected by way of a shaft 41 to a pinion 42 driving the gear 38₁. The motor M is also connected by way of the shaft 22 and shafts or equivalent mechanisms 43, 44 to drive the other cam gear 38, the metering roller 33, and the constant-torque driving mechanism 34. The motor M is energized from suitable electrical supply terminals 46 through an appropriate speed control arrangement, schematically illustrated as a voltage divided 47, connected across terminals 46 and having an adjustable contact 47a for applying an adjustable operating voltage to the motor. An electromagnetic brake 45 energized from the supply terminals 46 through a suitable control switch (not shown) is connected to the feed spool 11.

The film transport mechanism of the invention also includes means operating in synchronism with the reciprocating mechanism for the carriage 15, 16 for tripping the camera shutter at a predetermined point in the cycle of operation of the carriage. This means may be in the form of a cam 48 mounted on and operated by the main cam shaft 22 and cooperating with a cam roller 49 mounted on an arm 50 of an electric switch 51 having electrical circuit terminals 51a, 51a connected to a tripping mechanism for the camera shutter, not shown since it represents no part of the present invention.

In describing the operation of the film transport mechanism of the invention, reference is made to the charts of Figs. 4 and 5 of the drawings. In aerial photography, it is frequently desired that the pictures of successive exposures overlap, a common value for such overlap being 60%, so that, when adjacent pictures are disposed in an appropriate viewer, a stereoscopic image is obtained. This relationship is represented in the chart of Fig. 4, the relative dimensions being exaggerated for the sake of clarity. It is clear from Fig. 4 that the apparent image velocity at the image plane, and thus the velocity of the film during exposure, bears the same ratio to the ground speed of the plane as the image distance $i$ of the camera bears to the altitude $h$ of the plane. As an example, it may be assumed that the altitude and ground speed of the plane are such that the image velocity is 3.6″/sec. and the picture width is 9″ with ½″ between successive pictures. Then, in order to obtain a 60% overlap between successive pictures, an exposure will be made for each 3.6″ of image motion and the camera will be tripped at intervals of 1 second, which means that the film transport mechanism completes one cycle of operation per second and the cam shaft 22 rotates at one turn per second.

In order to supply fresh film to the camera aperture for each successive picture, the metering roller 33 must draw film through the transport mechanism at an average velocity of 9.5″/sec. Assume that the solid line curve A of Fig. 5 represents the instantaneous velocity of the film across the camera aperture throughout the operating cycle of the carriage 15, 16. In this same figure, dotted-line curve B represents the average velocity of the film drawn through the apparatus by the metering roller 33 and it will be assumed that this represents the greatest average velocity encountered in practice, for example, at the lowest altitude of flight or the highest plane speed, or a combination of both. The difference between the velocities represented by curves A and B must, of course, be made up by the motion of the carriage 15, 16 as it takes up film from one of the loops and feeds it out to the other loop.

Assume that the carriage 15, 16 has just reached its extreme right-hand position and commenced its left-hand movement for initiation of an exposure during which the film velocity across the aperture, which is the apparent image velocity, is 3.6″/sec. This point is represented at point $a$ of Fig. 5 and at this point the vacuum diaphragm 20 is tripped by pin 30 which raises latch 27, releasing arm 24a and crank 24 and thereby initiating the development of a vacuum. Simultaneously, the cam 48 closes switch 51 to initiate tripping of the camera shutter. The vacuum diaphragm 20 requires a certain time to develop a vacuum adequate to flatten the film against the platen 14, which may be of the order of 25 milliseconds and is represented by the time $a$—$b$ in Fig. 5. The camera shutter also requires a finite time to commence the exposure, which may be of the order of 40 milliseconds, the point of initiation of exposure being indicated at point $c$ in Fig. 5. The apparatus is designed so that the time required for the shutter to initiate exposure is always longer than that required for the vacuum diaphragm 20 to flatten the film against the platen 14, so that this operation is always completed by the time the shutter exposure commences.

Assume further that the longest exposure time is of the order of 40 milliseconds, so that it is completed at point d of Fig. 5. Therefore, the total duration of the exposure portion of the operating cycle, during which the velocity of the film is maintained equal to the image velocity, is the sum of the lead time of 40 milliseconds and the exposure time of 40 milliseconds, or 80 milliseconds plus a reasonable margin for safety. The cam 38a, which determines the shape of curve A, is given such a configuration that this period during which the film velocity is equal to the apparent image velocity is equal to the time a—c plus the longest exposure time to be provided plus a reasonable margin of safety. At the end of this exposure portion of the operating cycle, the film must be accelerated to a velocity considerably higher than the average velocity and then decelerated again in time for the succeeding exposure so that the time-integral of curve A, representing the total film movement, is equal to the time-integral of curve B.

In the event that the apparent image velocity is reduced to one-half of the value initially assumed, for example, 1.8″/sec., resulting from operation at a higher altitude or a lower ground speed, or both, the conditions are shown in Fig. 6 in which curve C represents the instantaneous film velocity and curve D the average film velocity. These reduced velocities are obtained by reducing the speed of the motor M by adjustment of the voltage divider 47. Since the film velocity is controlled over the operating cycle of the apparatus by the same mechanism, all velocities of curves C and D are varied proportionately relative to those of curves A and B, respectively, of Fig. 5. Under these conditions, to provide a 60% overlap between successive pictures, the camera shutter should be tripped at intervals of 2 seconds and the average speed of the film will be 4.75″/sec., as represented by curve D. It is noted that the points a, b, c, and d of Fig. 6 correspond to those of Fig. 5, so that at the reduced apparent image velocity the portion of each cycle during which the film moves at such velocity is lengthened.

In explaining the operation of the film transport mechanism described to realize the operating characteristics of Figs. 5 and 6, it will be assumed that initially the carriage 15, 16 is at its extreme left-hand position, as shown in Fig. 3 and represented by point d of Fig. 5, and that the platen 14 is at its extreme right-hand position. This corresponds to the instant that a camera exposure has been completed. The left-hand or supply side film loop about the roller 17 is of maximum length and the right-hand take-up loop about the roller 18 contains a minimum length of film. The carriage 15, 16 is driven to the right by the reciprocating mechanisms including the cam grooves 38a, 38a₁ and the levers 36, 36₁, bodily transporting a length of film across the aperture 10a and lengthening the take-up loop and correspondingly shortening the supply side loop. Simultaneously, the contant-speed metering roller 33 pulls the film 13 through the carriage so that the resultant velocity of the film 13 past the aperture is the sum of the tangential velocity of the metering roller 33 and twice the velocity of the carriage 15, 16. At the same time the reciprocating mechanism including the cam grooves 38b, 38b₁ and the levers 39, 39₁ drives the platen 14 toward the left. This motion has no effect on the film, since no vacuum is applied to the platen 14. During these operations, of course, the camera shutter is closed.

The film transport is completed when the carriage 15, 16 reaches the extreme right-hand point of its travel, represented by point a of Fig. 5. Further actuation of the cam gears 38 and 38₁ by the drive shaft 22 causes the carriage 15, 16 to commence its travel to the left and the movement of the platen 14 to the right. During this portion of the operating cycle, much of the film 13 metered by the metering roller 33 is supplied by the slack given up in the right-hand film loop so that, during this exposure portion of the operating cycle, the velocity of the film 13 relative to the camera aperture is the difference between the constant velocity of the film advance, as determined by the metering roller 13, and twice the velocity of the carriage 15, 16. The cams and levers of the reciprocating mechanisms are relatively so proportioned that this film velocity past the camera aperture 10a during exposure is of a relatively low value, as shown in Figs. 5 and 6, and substantially equal to, and effective substantially to compensate for, apparent image motion.

At this point a of Fig. 5, the cam 48 closes switch 50 to initiate opening of the camera shutter, and exposure is actually initiated at the point c, as previously explained. Simultaneously with the closing of switch 50, the pin 30a releases the latch arm 27, rapidly releasing the diaphragms 19 and 20 to produce a partial vacuum at the back of the platen 14 which, through the apertures 14a, sucks the film against the platen and holds it in intimate contact therewith. This operation is completed at the point b of Figs. 5 and 6. Obviously, the cam grooves 38b and 38b₁ and their associated actuating levers 39 and 39₁, respectively, are relatively proportioned so that the platen 14 moves at exactly the resultant velocity of the film during the exposure period when the film is in intimate engagement with the platen.

When the carriage 15, 16 reaches its extreme left-hand point of travel and the platen 14 its extreme right-hand point of travel, the exposure cycle is completed and the apparatus is conditioned for the succeeding exposure. This operating cycle is, of course, repeated for the desired number of exposures.

Thus, it is seen that, during a rapid series of successive exposures, the film 13 is moved rapidly across the camera aperture 10a between successive exposures and during exposures at a relatively low velocity sufficient only to compensate for apparent image velocity. At the same time, the film is withdrawn from the feed spool 11 and supplied to the take-up spool 12 at a constant speed, thereby obviating the necessity of intermittently accelerating and decelerating these spools and their associated driving mechanism and thus permitting a series of exposures in much more rapid sequence. When the desired series of exposures has been completed, the electromagnetic friction brake 45 is energized from the circuit 46 by any suitable control means (not shown) to absorb the energy of the rotating feed spool 11. At all other times the spool 11 rotates freely under the tension of the film 13 drawn through the mechanism by the metering mechanism 33.

In the embodiment of the invention described, an overlap of successive pictures of 60% has been assumed. In some applications it may be desirable to include in the film transport mechanism provisions for adjusting the percentage overlap over a range of values including zero. A modification of the apparatus for this purpose is represented in Fig. 7 which illustrates a modified form of a single reciprocating mechanism corresponding to one of the reciprocating mechanisms of the apparatus of Fig. 1, corresponding elements being identified by the same reference numerals and analogous elements by reference numerals increased by 100. This modified mechanism of Fig. 7 includes an adjustable mechanism for modifying the effectiveness of the cam 38a to adjust the relative velocities of the film during exposure and between exposures and an adjustable mechanism for correspondingly modifying the platen-reciprocating cam 33b. More specifically, the cam groove 38a of cam 38 secured to the drive shaft 22 cooperates with a lever 136 engaging a slide block 101 carrying a pivot pin 102 so that the lever 136 is effectively pivoted at that point. The lever 136 carries a follower pin 136b engaging the cam 38a and is connected through a pin 137 to drive the carriage 15, 16. This reciprocating mechanism also includes a second pivoted lever 139 engaging a slide block 105 carrying a pivot pin 106 so that the lever 139 is effectively pivoted at that point. The lever 139 has a follower pin 139b engaging the cam groove 38b and is provided with a pin 140 connected to reciprocate the platen 14.

The reciprocating mechanism of Fig. 7 further includes a pair of adjustable mechanisms for individually shifting the pivot points of the levers 136 and 139 to adjust the relative velocities of the film during exposure and between exposures and for adjusting the velocity of the platen 14 correspondingly during exposures. The first of these mechanisms is in the form of a lever 103 supported on a shaft 104 journalled in the frame structure of the apparatus and pivotally connected to slide block 101 by the pivot pin 102. Secured to the shaft 104 is a pointer 109 and a co-operating scale 109a. The other of these pivot-shifting mechanisms comprises a lever 107 mounted on a shaft 108 likewise journalled in the frame structure of the apparatus, the lever 107 being pivotally connected to the slide block 105 by the pin 106. The shaft 108 is provided with a pointer 110 co-operating with a scale 110a. Therefore, adjustment of lever 103 adjusts the slide block 101 and thus the effective pivot point of the lever 136 to vary the effective throw of cam 38a and thus the velocity of reciprocation of the carriage 15, 16. Similarly, adjustment of the lever 107 shifts the pivot pin 106 and thus the effective throw of the cam 38b and the velocity of reciprocation of the platen 14.

The operation of the modified form of reciprocating mechanism may be understood by reference to the curves of Fig. 8 which are assumed to represent operating characteristics with a 10% overlap of successive pictures. In this figure, curve E represents the instantaneous velocity and curve F the average velocity of the film as it moves across the camera aperture. As indicated by curve F, the average film velocity is assumed to be 9.5"/sec. as in the previous embodiment, but the apparent image velocity is now 8.1"/sec. These conditions, therefore, require a higher velocity of the platen 14 and a lower velocity of the carriage 15, 16 than with a 60% overlap. This is effected by shifting the pivot pin 106 of the lever 139 downward closer to the cam follower pin 139b and by shifting the pivot pin 102 for the lever 136 downward closer to the actuating pin 137. It will be clear that the indicating scales 109a and 110a may be calibrated directly in terms of percentage overlap.

For a given image velocity, the speed of the motor M and the cam shaft 22 bear a different relationship to the average film velocity for the 10% overlap condition represented in Fig. 8 than that which prevailed for the 60% overlap condition so that, with the modification of Fig. 7, there is required an adjustable speed motor for driving the cam shaft 22 independent of that which drives the metering roller 33 or a suitable adjustable-speed-ratio mechanism must be interposed between motor M and the cam shaft 22. For example, as shown in Fig. 7, the shaft 22 may be driven by an auxiliary motor $M_1$ energized from the supply circuit terminals 46, 46 through a resistor 147 having an adjustable contact 147a actuated by one of the overlap-adjusting pointers 109, 110. Specifically the contact 147a is connected to be actuated by the shaft 104 of pointer 109. By proper proportioning of the overlap-adjusting mechanisms described, the shafts 104 and 108 and the contact 147a can all be mechanically connected for unicontrol, automatically to vary the speed of motor $M_1$ and shaft 22 with variations in overlap.

If a zero overlap is desired for successive pictures, the instantaneous film velocity is equal to the average film velocity over the entire operating cycle and the lever 103 is adjusted to move the pivot pin 102 coaxial with the pin 137, so that the carriage 15, 16 remains stationary. At the same time, the pivot pin 106 is shifted to a position still closer to the cam follower pin 139b to increase the velocity of reciprocation of the platen 14 to the higher value of film velocity during exposures.

Furthermore, if it should be desired to take pictures with the film stationary during exposures, by a proper configuration of the cam 38a the velocity of the carriage 15, 16 during exposure may be made equal to one-half the average film velocity, so that the instantaneous film velocity during the exposure period is equal to zero.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A film transport mechanism for a camera including an aperture frame comprising: a film platen; a carriage reciprocable across the camera aperture including means for supporting a film and translating it between said platen and the aperture frame; a substantially constant-speed film-advancing mechanism for translating a film through said carriage independently of the movement thereof; a reciprocating mechanism including a drive shaft, a pair of cams coupled thereto, and a first pivoted lever having a follower engaging one of said cams and connected to drive said carriage during the interval between exposures in the same direction as the direction of advance of the film and during exposure in a direction opposite to the direction of advance of the film, said one of said cams being proportioned to impart to the film during exposure a relatively low velocity of a value substantially to compensate for image velocity and between exposures a relatively high velocity; means including a second pivoted lever having a follower engaging the other of said cams for reciprocating said platen during exposure at a velocity substantially equal to that of the film; and a pair of coupled adjustable mechanisms for individually and simultaneously shifting the pivots of said levers to adjust the velocities of said carriage and said platen in opposite senses to adjust the percentage overlap of successive exposures.

2. A film transport mechanism for a camera including an aperture frame comprising: a film platen; a carriage reciprocable across the camera aperture including means for supporting a film and translating it between said platen and the aperture frame; a substantially constant-speed film-advancing mechanism for translating a film through said carriage independently of the movement thereof; a reciprocating mechanism including a drive shaft, a pair of cams coupled thereto, and a first pivoted lever having a follower engaging one of said cams and connected to drive said carriage during the interval between exposures in the same direction as the direction of advance of the film and during exposure in a direction opposite to the direction of advance of the film, said one of said cams being proportioned to impart to the film during exposure a relatively low velocity of a value substantially to compensate for image velocity and between exposures a relatively high velocity; means including a second pivoted lever having a follower engaging the other of said cams for reciprocating said platen during exposure at a velocity substantially equal to that of the film; a pair of coupled adjustable mechanisms for individually and simultaneously shifting the pivots of said levers to adjust the velocities of said carriage and said platen in opposite senses to adjust the percentage overlap of successive explosures; and an adjustable-speed drive for said drive shaft independent of said film-advancing mechanism.

3. A film transport mechanism for a camera including an aperture frame comprising: a film platen; a carriage reciprocable across the camera aperture including means for supporting a film and translating it between said platen and the aperture frame; a substantially constant-speed film-advancing mechanism for translating a film through said carriage independently of the movement thereof; a reciprocating mechanism including a drive shaft, a pair of cams coupled thereto, and a first pivoted lever having a follower engaging one of said cams and connected to drive said carriage during the interval between exposures in the same direction as the direction of advance of the film and during exposure in a direction opposite to the direction of advance of the film, said one of said cams being proportioned to impart to the film during exposure of relatively low velocity of a value substantially to compensate for image velocity and between exposures a relatively high velocity; means including a second pivoted lever having a follower engaging the other of said cams for reciprocating said platen during exposure at a velocity substantially equal to that of the film; a pair of coupled adjustable mechanisms for individually and simultaneously shifting the pivots of said levers to adjust the velocities of said carriage and said platen in opposite senses to adjust the percentage overlap of successive exposures; driving means for said cam drive shaft; and means coupled to said adjustable mechanisms for adjusting the speed of said driving means concurrently with variations in said percentage overlap.

References Cited in the file of this patent

UNITED STATES PATENTS

| | | |
|---|---|---|
| 1,479,888 | Bowell | Jan. 8, 1924 |
| 1,586,071 | Cooke | May 25, 1926 |
| 1,992,706 | Lira | Feb. 26, 1935 |
| 2,424,989 | Koepfer | Aug. 5, 1947 |
| 2,474,323 | Rattray | June 28, 1949 |
| 2,713,814 | Sonne et al. | July 26, 1955 |